Patented Nov. 7, 1933

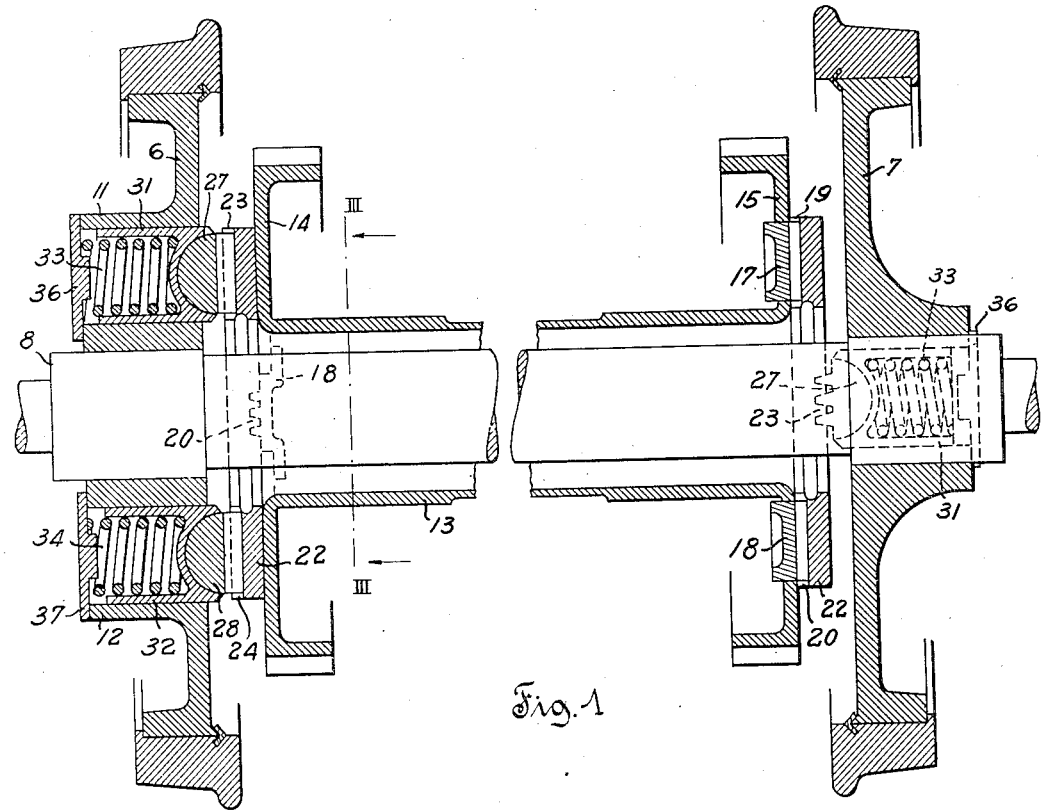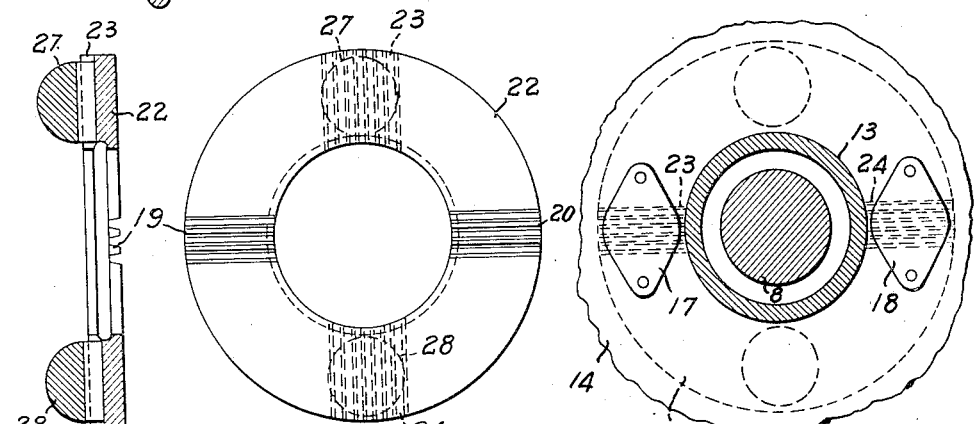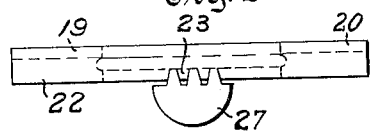

1,934,113

UNITED STATES PATENT OFFICE 1,934,113

FLEXIBLE COUPLING

Jacob Buchli, Winterthur, Switzerland, assignor to Aktiengesellschaft Brown Boveri & Cie., Baden, Switzerland, a joint-stock company of Switzerland Application April 7, 1932, Serial No. 603,786, and in Germany April 10, 1931

6 Claims. (Cl. 105—132)

This invention relates to improvements in drives for the traction wheels of power driven vehicles and more particularly to the driving connections between each pair of traction wheels of a locomotive and a source of power arranged adjacent each pair of such wheels.

Power driven vehicles such as electric locomotives are preferably provided with a motor to drive each pair of traction wheels. Such motors being preferably rigidly mounted in the main frame of the vehicle, a flexible connection must be provided between the motors and the wheels to permit relative movement therebetween upon the occurrence particularly of movements of the wheels having a vertical component. A large number of flexible coupling constructions have already been described. The known types of flexible couplings are not, however, readily applicable to traction wheels of small diameters, are complicated and expensive to construct and are difficult to inspect and repair without disassembling the entire structure.

It is, therefore, the object of the present invention to provide a flexible driving connection between a source of power and each pair of traction wheels of a power driven vehicle such as an electric locomotive.

Objects and advantages other than those above set forth will be apparent from the following description when read in connection with the accompanying drawing, in which:

Figure 1 is a vertical sectional view taken substantially on a central plane through one pair of traction wheels of a locomotive, the two wheels being rotated ninety degrees relative to each other for the purpose of more clearly illustrating the driving connection between the driven gear wheels and the track wheels;

Figure 2 is an elevation taken from one side of a portion of the coupling structure between the power driven gear wheels and the traction wheels;

Figure 3 is a view similar to that shown in Figure 2 but taken on a plane III—III of Figure 1;

Figure 4 is a cross sectional view of the coupling member arranged between the power driven gears and the traction wheels; and Figure 5 is a view similar to that shown in Figure 4 but rotated ninety degrees relative to Figure 4 to illustrate the construction of the connecting member more clearly.

Referring more particularly to the drawing by characters of reference, the reference numerals 6 and 7 designate a pair of flanged traction wheels of a locomotive rigidly mounted on an axle 8 for rotation therewith. The axle 8 is preferably journaled at the ends thereof in bearings mounted in the main frame (not shown) of the locomotive. Each of the wheels is formed with a pair of cylinders 11 and 12 between the hub and the periphery of the wheel on a diameter of the wheel on opposite sides of the hub thereof and extending parallel to the center line of the axle.

A hollow shaft or quill 13 is arranged about the axle 8 and is preferably formed with flanged ends 14 and 15 on which teeth are formed. A pair of gear wheels integral with the quill 13 are thus formed by the ends and rotate with the quill 13 which is supported in any suitable manner from the main frame of the locomotive. The gear wheels 14 and 15 are arranged to engage the gear pinions of an electric motor (not shown) and are preferably of the resiliently mounted tooth type such as is well known. Each of the gears 14 and 15 is provided with a pair of toothed members 17 and 18 secured thereto in any suitable manner and arranged on opposite sides of the quill 13, i. e., one hundred and eighty degrees from each other. The teeth of members 17 and 18 engage in similarly toothed portions 19 and 20 of a ring 22 which is also provided with teeth as at 23 and 24 formed in the ring on a diameter at right angles to the diameter through the toothed portions 19 and 20. The teeth 23 and 24 are arranged to engage toothed semi-spheres or ball members 27 and 28 forming the ball portions of ball and socket joints. The socket portions of the joints are formed in the ends of sleeves 31 and 32 sliding in the cylinders 11 and 12. Compression springs 33 and 34 are retained within the sleeves between the ends thereof and plates 36 and 37 suitably secured on the wheels 6 and 7 to close the ends of the cylinders 11 and 12 formed therein. The springs are preferably of such size that all of the teeth on the ring and the several toothed members engaged therewith are held in close engagement with each other.

When the gears 14 and 15 are being driven by the motor (not shown), power is transmitted through toothed members 17 and 18 to the ring 22 and through the ring to the balls 27 and 28 and to the sleeves 11 and 12 and hence to the wheels 6 and 7. Upon the occurrence of a thrust on either of the wheels, such as would be caused by the wheels moving over a high joint in the rails or by any other means which would produce a movement of the wheels 6 and 7 having a vertical component, the coacting pairs of the toothed portions extending in a vertical direction at that moment will slide on each other to permit the wheels 6 and 7 to move in a direction having a vertical component while the gears 14 and 15 remain stationary relative to the rails on which the wheels 6 and 7 run. The pairs of toothed portions which slide on each other will, of course, be determined by the direction from which the thrust comes. The ball and socket joint connections permit free relative angular movement between the wheels and the gears in any direction.

The teeth are cut into the rings 22 and the entire coupling between the gears and the drive wheels, therefore, requires only a very narrow space. Such minimizing of space required is particularly possible because a plurality of relatively narrow teeth are used rather than a single broad tooth. The several portions of the coupling are so designed as to require only the cheapest of manufacturing operations thus producing a very cheap construction. The entire coupling is so designed as to be readily accessible for inspection and repair e. g., only the covers 36 and 37 need to be removed to permit removal and replacement of the springs 33 and 34, the sleeves 31 and 32 and the ball members 27 and 28. Due to the action of the springs which retain all of the teeth on the various portions of the entire coupling in close engagement and the reduction of the degree of relative movement between the various portions of the coupling, the entire drive is very quiet and stresses caused by large relative movements of the several portions of the coupling are avoided.

It will be understood that the arrangement of the several portions of the coupling may be reversed as by forming the ball ends of the ball and socket joints on the sleeves and the socket ends thereof on the ring rather than as shown. The gears may also be arranged externally of the wheels instead of between such wheels and the quill may be omitted entirely. The gears may then be secured on shafts rotating in bearings supported from the main frame of the locomotive.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a drive for the traction wheels of vehicles, a pair of traction wheels, an axle connecting said wheels, a quill surrounding said axle and having gears formed on the ends thereof, toothed members mounted on the gears, rings having a plurality of toothed portions, some of the toothed portions of said ring engaging with said toothed members on the gear, semi-spherical members having a surface formed with teeth engaging some of the toothed portions of said rings, and socket members connected with said wheels to receive said semi-spherical members.

2. In a drive for vehicles, the combination of a rotatable axle having a traction wheel affixed thereto, means for driving said wheel comprising a gear arranged about said axle and spaced from said wheel, a power transmitting member disposed in the space between said wheel and gear and having a plurality of angularly displaced toothed portions, angularly toothed portions arranged on said gear engaging certain of the first said toothed portions, and means comprising a plurality of ball and socket members supported in said wheel and each having a toothed portion engaging with a toothed portion of the first said member other than said toothed portions thereof engaging with the said toothed portions of said gear.

3. In a drive for vehicles, the combination of a rotatable axle having a traction wheel affixed thereto, means for driving said wheel comprising a gear arranged about said axle and spaced from said wheel, a power transmitting member disposed in the space between said wheel and gear and having a plurality of angularly displaced toothed portions, said gear including a plurality of toothed portions engaging with certain of the first said toothed portions, means comprising a plurality of ball and socket members movably supported in said wheel and each having a toothed portion engaging with a toothed portion of the first said member other than the said toothed portions thereof engaged by said toothed portions of said gear, and means for maintaining resilient engagement of said toothed portions of said members.

4. In a drive for vehicles, the combination of a rotatable axle having a traction wheel affixed thereto, means for driving said wheel comprising a gear arranged about said axle substantially concentric with said wheel and spaced therefrom, a power transmitting member arranged in the space between said wheel and gear and having a plurality of angularly displaced toothed portions, said gear including a plurality of angularly displaced toothed portions respectively engaging with certain of the first said toothed portions to form slidable connection of said gear with said member, means comprising a plurality of universal joints supported in said wheel and each having a toothed portion engaging with a toothed portion of said member other than the said toothed portions thereof engaged by said toothed portions of said gear to form slidable connection of said member with said wheel, and means engaging with said wheel and said universal joints for maintaining resilient engagement of said toothed portions of said universal joints with said member and therethrough resilient connections of said toothed portions of said gear with said member.

5. In a drive for vehicles, the combination of a pair of spaced traction wheels affixed to an axle extending therebetween, means for driving said wheels comprising, a quill shaft surrounding said axle intermediate said wheels and having a gear formed on each end thereof adjacent to but spaced from said wheels, a power transmitting ring member disposed in the space between each of said wheels and the said gear adjacent thereto, each said member including a plurality of angularly displaced toothed portions facing towards the adjacent one of said gears and a plurality of angularly displaced toothed portions facing towards the adjacent one of said wheels, each said gear including a plurality of angularly displaced toothed portions engaging respectively with the first said toothed portions of the adjacent said ring member to form slidable connections of said ring members with the said gears, a plurality of universal joint members supported in each said wheel and each having a toothed portion engaging respectively with the second said toothed portions of the said ring member adjacent thereto to form slidable and rotatably movable connections of said wheels with the adjacent said ring members, and means engaging with said wheels and universal joints operable to press the respective said universal joint members toward the adjacent ring member to thereby maintain resilient relatively movable connection of the respective wheels with the adjacent ring member and therethrough resilient relatively movable connection of said wheels with the said adjacent gear.

6. In a drive for vehicles, the combination with a traction wheel having a plurality of apertures therein intermediate the rim and hub thereof and affixed to a rotatable axle, means for driving said wheel comprising a gear arranged about said axle substantially concentric with but spaced from said wheel, a power transmitting member disposed in the space between said wheel and gear, the said member having a plurality of angularly displaced toothed portions facing towards said gear and a plurality of angularly displaced toothed portions facing towards said wheel, said gear including angularly displaced toothed portions respectively engaging the first said toothed portions to form slidable connections between said gear and member, a plurality of universal joints each comprising cooperating ball and socket members supported respectively in said apertures and each including a toothed portion engaging a toothed portion of said power transmitting member facing said wheel to form sliding connections of said wheel with said power transmitting member, a removable plate individual to and closing said apertures, and spring means disposed in each said aperture between said plate thereof and the said universal joint supported therein operable to resiliently press the said toothed surface of the latter into engagement with the said cooperating toothed portion of said power transmitting member, the said plates constituting means permitting removal of said universal joints by way of said apertures.

JACOB BUCHLI.